Jesse B. Thomas INVENTOR.

Jesse B. Thomas INVENTOR.

BY

Patented June 1, 1948

2,442,625

UNITED STATES PATENT OFFICE 2,442,625

PACKLESS VALVE

Jesse B. Thomas, Jackson Heights, N. Y., assignor, by mesne assignments, to the United States of America as represented by the United States Atomic Energy Commission Application December 16, 1943, Serial No. 514,510

6 Claims. (Cl. 137—139)

This invention relates to improvements in valves for controlling the flow of fluids, and particularly to a streamline packless valve for relatively large pipe lines conducting gases or liquids.

It is one of the objects of this invention to provide a valve construction having a substantially streamline interior permitting a streamline flow of fluids therethrough in all positions of adjustment other than the valve closed position.

Another important object of the invention is to provide a valve construction without packing and suitable for controlling the flow of gaseous and/or liquid chemicals of a corrosive nature without leakage.

Another object of the invention is to provide a packless valve which creates a minimum change in the normal direction of fluid flow, which in the open position may have little or no decrease in the cross sectional area of the flow passage therethrough, and which also prevents the formation of eddy currents within the valve casing.

A further object of the invention is to provide a valve which may be readily adjusted from the open position to various intermediate positions and to the closed position by pressure responsive means effectively sealed from contact with the fluids being controlled.

A further object of the invention is to provide a streamline packless valve having a manual actuator mechanism to adjust the valve, or to close, or to assist in closing, or to lock the valve in the closed position.

A still further object of the invention is to provide a simple valve construction of the character described adapted for economical manufacture from corrosion-resistant materials.

Other objects and advantages will be readily apparent from the following description and the accompanying drawings illustrating a preferred embodiment of the invention.

The valve herein disclosed includes a valve casing having a streamline interior passage and a hollow extensible body of streamline configuration within the passage. The streamline body in its extended position engages a valve seat portion of the casing to close the valve. Actuating means for extending the streamline body to various positions are within the hollow portion of the body, not exposed to fluids passing through the casing, and hence do not interfere with a full streamline flow of fluid through the open valve. The streamline body and actuating means are constructed to eliminate the need for conventional packing and hence a leakproof construction is attained.

Figure 1:
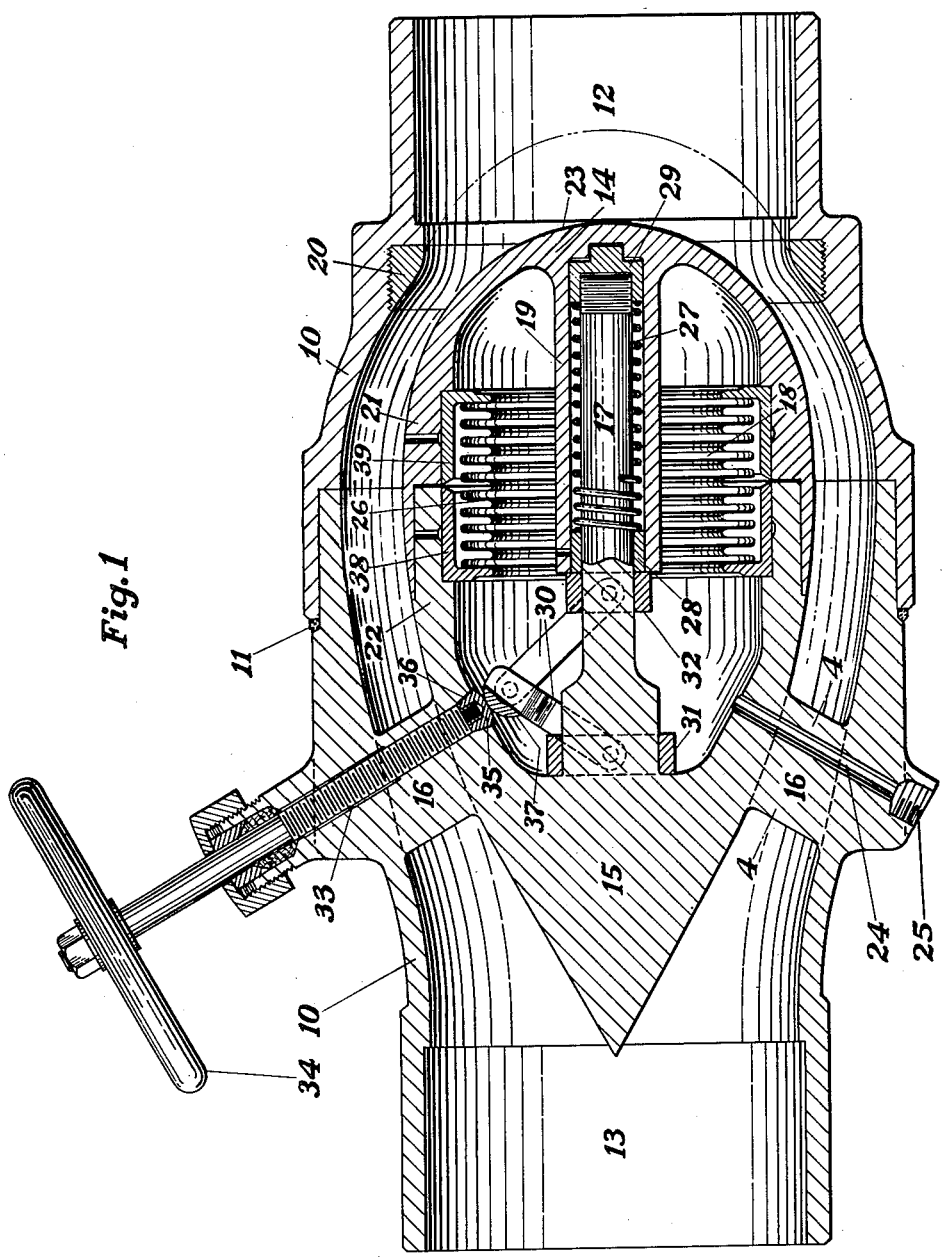
Figure 2:
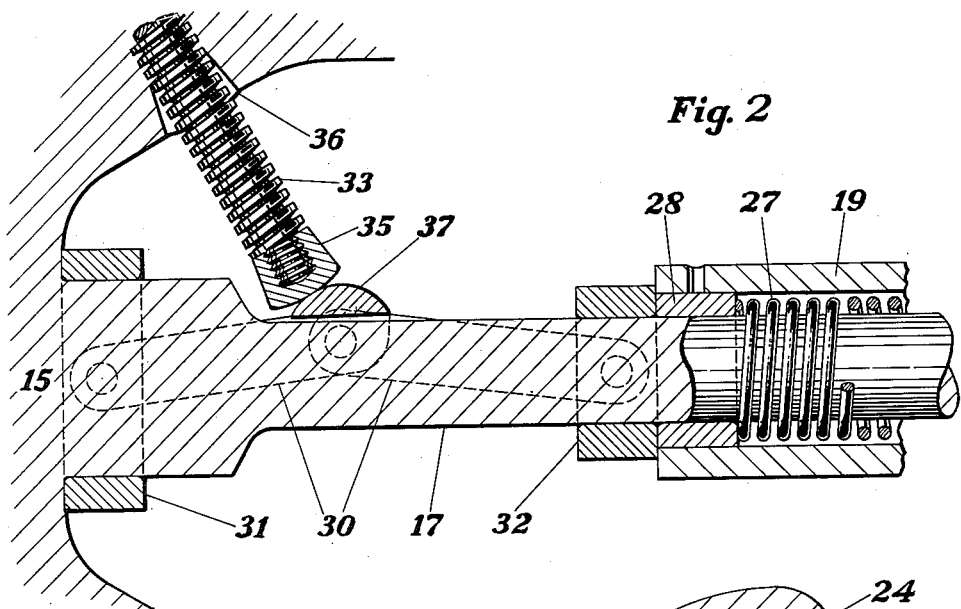
Figure 4:
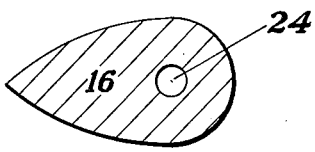
Figure 3:
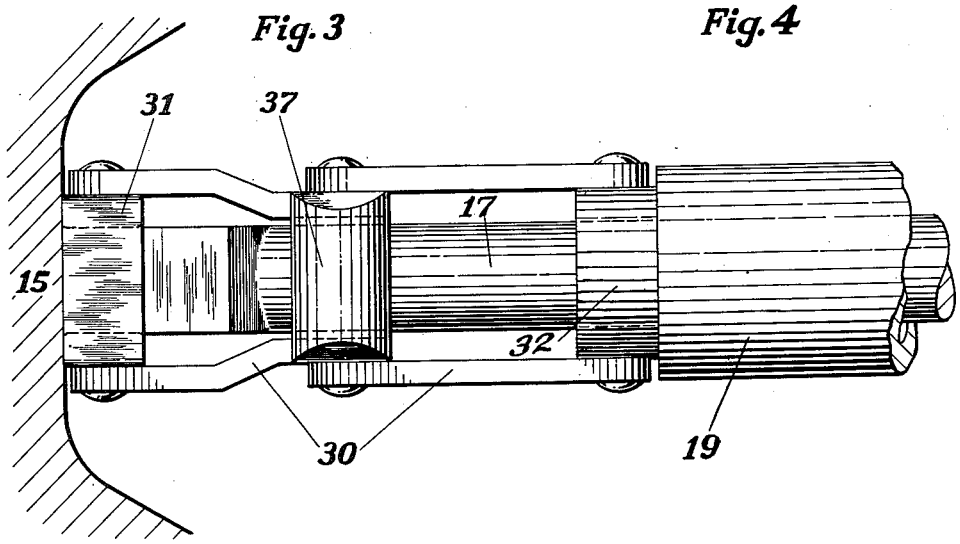

Referring to the drawings, Fig. 1 is a longitudinal section through a valve shown in the open position. Fig. 2 is a partial elevation and section showing a manual actuator mechanism in the valve closed position. Fig. 3 is a plan view of the actuator mechanism shown in Fig. 2. Fig. 4 is a section on line 4—4 of Fig. 1 showing the streamline shape of one of the valve support arms.

A valve casing 10 which may consist of two parts, is fastened together at 11 by welding or other means, and is provided with an inlet 12 and an outlet 13. The valve casing 10 is enlarged at its central portion to receive a valve head 14 and a support member 15 within the casing between the inlet 12 and outlet 13. The support member 15 is positioned in and spaced from the casing 10 by one or more radial arms 16. Member 15 may be cast integral with one part of the casing 10 and the arm or arms 16, or it may be a separate element suitably secured to the arm or arms 16 by welding or other means.

The central portion of the member 15 is hollow and is provided with a central stud 17. The valve head 14 has a valve stem 19 engaging the stud 17 and is movable from the open position shown in Fig. 1 to a closed position indicated by dotted lines in the same figure. In the closed position, the head 14 engages the inner surface of the casing which is formed to provide an annular valve seat 20 at the point or points of contact with the head. It will be appreciated that the annular valve seat 20 may be made separate and renewable.

The valve head 14 is provided with a skirt 21 having sliding contact over a cylindrical portion 22 of the support member 15. It will be noted that the valve head 14 has a substantially spherical outer surface 23, and that when the valve is in the open position shown in Fig. 1, the head 14, skirt 21 and the outer surface of member 15 form a streamline, teardrop shape offering minimum resistance to the passage of fluids from the inlet 12 to the outlet 13. The support member 15, the valve head 14 and the connecting skirt 21 together form an extensible body having a substantially streamline configuration in all its positions of adjustment. The hollow central portion of support member 15 closed by the head 14 and skirt 21 forms an expansible chamber 18 in the interior of said extensible body. The enlargement of the casing 10 is substantially concentric around the extensible body and is spaced therefrom to provide a passage having an annular cross section area which may, if desired, equal the cross section area of the openings at inlet 12 and outlet 13. As shown in Fig. 4, the cross section of the arm or arms 16 is also streamline with respect to the flow of fluid through the casing 10.

A passage 24 is provided through the casing 10 and through an arm 16 into the hollow portion of member 15 to admit fluid under pressure to the expansible chamber 18 for actuating the valve head 14 to various positions. The actuating fluid may come from any suitable external source, not shown, connected by well known means to the passage 24 by tap 25.

The sliding contact between the cylindrical portion 22 of the member 15 and the skirt 21 may be effectively sealed by use of a bellows or "Sylphon" type seal 26 having its ends soldered or otherwise fastened to flanged sleeves 38 and 39, which in turn are soldered or otherwise fastened to the member 15 and skirt 21, as shown in Fig. 1. The flanged sleeves 38 and 39 may, if desired, be eliminated. The "Sylphon" seal 26, which requires no packing, prevents the leakage of fluids passing through the casing into the interior of the extensible body and likewise prevents the leakage of valve actuating fluids from within the expansible chamber 18 into the fluid passage surrounding the member 15.

Resilient means in the form of a compression spring 27 may be provided on or in the valve stem 19 and positioned between a collar 28 on stem 19 and a collar or nut 29 on stud 17 for biasing the valve head 14 to the open position illustrated, thereby contracting said extensible body. In certain installations, the spring 27 may be dispensed with, and contraction of the extensible body effected solely by the pressure of fluid in the valve inlet 12.

Mechanical means for actuating the valve or holding the valve closed may include a toggle linkage 30 positioned between a collar 31 on stud 17 and a collar 32 engaging to the end of valve stem 19. A threaded spindle 33 entering the hollow portion of member 15 through the casing 10 and an arm 16 may be used to apply a force effective to straighten the toggle linkage 30 to the position shown in Figs. 2 and 3 and seat the valve head 14 in its closed position. The spindle 33 is provided with a hand wheel 34 at its outer end, and is provided with a bearing member 35 on its inner end. The end surface of bearing member 35 is preferably curved in order to provide rolling contact with the abutment portion 37 of the toggle linkage 30. The side surface of the bearing member 35 is preferably frustoconical to make tight contact with a similarly shaped reamed seat 36 when the mechanical actuating mechanism is not in use.

For use in controlling the flow of corrosive gases or liquids, the valve casing and the extensible body including the valve head and support members may be castings of lead and zinc-free bronze, and the seal or bellows may be Phosphor bronze. Valve actuating means in the interior of the extensible body, including the collars, toggle linkage, spring, spindle and the like, may be made from steel.

It will be apparent from the above description that, in the embodiment of my invention illustrated, the valve head 14 may be moved from the open position shown to various positions up to and including the closed position against the valve seat 20 by the admission of suitable fluid under pressure into the expansible chamber 18. Upon release or reduction of pressure within the chamber 18, the valve head 14 will be moved to the open position shown by expansion of the spring 27, or by the pressure of fluids in the valve inlet 12. Movement of the spindle 33 into the member 15 is effective to partially straighten the toggle linkage 30 so as to positively extend the head 14 to various positions including that against the valve seat 20 regardless of the availability of an actuating fluid under pressure. Moreover, the spindle and the toggle mechanism may be used to positively lock the valve in its closed position, if desired, without the continual application of actuating fluid under pressure.

The valve construction shown and described is packless in that there are no moving parts between which it is necessary to use compressed packing in order to prevent leakage of corrosive fluids from within the casing to the outside thereof. The sliding joint between the support member 15 and the skirt 21 of the valve head is effectively sealed without packing by the use of the bellows type seal 26. This seal 26 prevents the leakage of corrosive fluids from the casing into the interior of the extensible body containing the valve actuating mechanisms. The construction shown is of streamline shape to eliminate the formation of eddy currents in all positions, and there are no pockets in which fluids in the casing may become trapped. Moreover, there are no actuating means such as shafts, cams, threads, or the like, exposed to the corrosive action of fluids in the valve casing. The valve body extending means are exposed only to the interior of said extensible body.

Numerous variations and modifications of my invention may be made by those skilled in the art without departing from the spirit and scope of the invention as defined in the following claims.

I claim:

1. A valve comprising a valve casing having a valve seat therein; a valve head movable into engagement with said seat; a support for said head; arms securing said support within and spaced from said casing, said head and said support together forming an expansible sealed chamber; said casing, one of said arms and said support being formed to provide a passage leading to said chamber for admitting fluid under pressure to move said head into engagement with said seat; manually operable means including a threaded spindle extending through said casing, one of said arms and said support; and toggle linkage within said chamber, actuable by said manually operable means for forcing said head into engagement with said seat.

2. A valve comprising a valve casing having a valve seat therein; a valve head movable into engagement with said seat; a support for said head; an arm securing said support within and spaced from said casing, said head and said support together forming an expansible chamber; a threaded spindle extending through said casing, said arm and said support into said chamber; and toggle linkage within said chamber to move said head into engagement with said seat, said linkage comprising a pair of pivotally interconnected links respectively pivotally held with respect to said support and said head, said spindle being arranged to slidably contact at least one of said links adjacent the pivotal interconnection of the links.

3. A packless valve for fluids comprising a valve casing having an inlet and an outlet in alignment and having a valve seat adjacent the inlet;

a valve head having a spherically shaped surface within said casing movable into engagement with said seat; a hollow support for said head within and spaced from said casing; a plurality of substantially radial arms of streamline cross-section connecting said support to said casing; said valve head being provided with a skirt in sliding engagement with said support whereby said support and head together form a substantially teardrop shaped body having an internal expansible chamber; a bellows type seal within said chamber and secured to both the support and the skirt to prevent leakage of fluids from the casing into said chamber; resilient means within said chamber extending between said head and said support for biasing said head away from said valve seat; said casing, one of said arms and said support being formed to provide a continuous passage leading to said chamber for admitting fluid under pressure to actuate said valve head; a spindle extending through said casing, one of said arms and said support into said chamber; and means including a toggle linkage between said support and said head and engageable by said spindle for actuating said valve head and locking said head in closed position against said valve seat.

4. A valve comprising a valve casing having a valve seat therein; a valve head movable into engagement with said seat; a support for said head; an arm securing said support within and spaced from said casing, said head and said support together forming an expansible chamber; a threaded spindle extending through said casing, said arm and said support into said chamber; toggle linkage within said chamber having a portion arranged for slidable contact with said spindle to move said head into engagement with said seat; and resilient means within said chamber between said head and said support for biasing said head away from said valve seat.

5. A valve comprising a valve casing having a valve seat therein; a valve head movable into engagement with said seat; a support for said head; said head and said support together forming an expansible sealed chamber; arms securing said support within and spaced from said casing; a threaded spindle extending through said casing, one of said arms and said support into said chamber; and toggle linkage within said chamber having a portion arranged for sliding contact with said spindle to move said head into engagement with said seat; said casing, one of said arms and said support being formed to provide a passage leading to said chamber for admitting fluid under pressure to move said head into engagement with said seat.

6. A valve comprising a valve casing having a valve seat therein; a valve head movable into engagement with said seat; a support for said head; said head and said support together forming an expansible sealed chamber; arms securing said support within and spaced from said casing; a threaded spindle extending through said casing, one of said arms and said support into said chamber; toggle linkage within said chamber having a portion arranged for sliding contact with said spindle to move said head into engagement with said seat; said casing, one of said arms and said support being formed to provide a passage leading to said chamber for admitting fluid under pressure to move said head into engagement with said seat; and resilient means within said chamber between said head and said support for biasing said head away from said valve seat.

JESSE B. THOMAS.

REFERENCES CITED

The following references are of record in the file of this patent:

UNITED STATES PATENTS

| Number | Name | Date |
| --- | --- | --- |
| 1,294,491 | Lavigne | Feb. 18, 1919 |
| 1,459,775 | Larner | June 26, 1923 |
| 1,491,301 | Graffin | Apr. 22, 1924 |
| 1,545,209 | Steckel | July 7, 1925 |
| 1,561,544 | How | Nov. 17, 1925 |
| 1,856,222 | McClellan | May 3, 1932 |
| 1,936,650 | Wade | Nov. 28, 1933 |
| 2,044,437 | Macpherson | June 16, 1936 |

FOREIGN PATENTS

| Number | Country | Date |
| --- | --- | --- |
| 570,411 | France | 1924 |